United States Patent
Rodriguez Perez et al.

(10) Patent No.: US 8,625,458 B2
(45) Date of Patent: Jan. 7, 2014

(54) DYNAMIC ROUTE COST ADJUSTMENT OF VRRP ENABLED SUBNETS FOR ROUTING PROTOCOLS

(75) Inventors: David Rodriguez Perez, Moorpark, CA (US); Edgard Vargas, Moorpark, CA (US)

(73) Assignee: Alcatel Lucent, Paris (FR)

( * ) Notice: Subject to any disclaimer, the term of this patent is extended or adjusted under 35 U.S.C. 154(b) by 437 days.

(21) Appl. No.: 12/787,981

(22) Filed: May 26, 2010

(65) Prior Publication Data
US 2011/0292933 A1 Dec. 1, 2011

(51) Int. Cl.
*H04L 12/28* (2006.01)
*G06F 15/177* (2006.01)

(52) U.S. Cl.
USPC .......... 370/254; 370/229; 370/235; 370/255; 370/396; 370/497; 709/220

(58) Field of Classification Search
None
See application file for complete search history.

(56) References Cited

U.S. PATENT DOCUMENTS

| | | | | |
|---|---|---|---|---|
| 6,397,260 | B1* | 5/2002 | Wils et al. ............ | 709/238 |
| 6,556,547 | B1* | 4/2003 | Srikanth et al. ........ | 370/317 |
| 7,561,571 | B1* | 7/2009 | Lovett et al. .......... | 370/392 |
| 7,664,110 | B1* | 2/2010 | Lovett et al. .......... | 370/392 |
| 7,948,993 | B2* | 5/2011 | Kini et al. ............ | 370/395.54 |
| 8,213,439 | B2* | 7/2012 | Natarajan ............. | 370/401 |
| 2002/0097721 | A1* | 7/2002 | McKenzie et al. ...... | 370/392 |
| 2006/0126502 | A1* | 6/2006 | Vasseur et al. ........ | 370/221 |
| 2006/0146835 | A1* | 7/2006 | Homchaudhuri et al. ............... | 370/395.53 |
| 2008/0151882 | A1* | 6/2008 | Sanjay et al. .......... | 370/389 |
| 2009/0016215 | A1* | 1/2009 | Nadas et al. .......... | 370/230 |
| 2010/0142410 | A1* | 6/2010 | Huynh Van et al. ..... | 370/255 |
| 2010/0149980 | A1* | 6/2010 | Cheung et al. ......... | 370/235 |
| 2010/0189117 | A1* | 7/2010 | Gowda et al. ......... | 370/401 |
| 2010/0228837 | A1* | 9/2010 | Squire et al. .......... | 709/220 |
| 2011/0292933 | A1* | 12/2011 | Rodriguez Perez et al. .. | 370/389 |

OTHER PUBLICATIONS

Jewell et al. RFC 2787 Mar. 2000.*
H3C Document Jun. 2009.*
Jewell et al.—Definitions of Managed Objects for the Virtual Router Redundancy Protocol—Mar. 2000.*
McCloghrie et al.—Management Information Base for Network Management of TCP/IP-based internets: MIB-II—Mar. 1991.*
Nadas—Virtual Router Redundancy Protocol Version 3 for IPv4 and IPv6 draft-ietf-vrrp-unified-spec-05—Dec. 2009.*
Hinden—Virtual Router Redundancy Protocol (VRRP)—Apr. 2004.*
Rekhter et al, "A Border Gateway Protocol 4 (BGP-4)", Request for Comments 4271, 2006, pp. 1-104.
Nadas, "Virtual Router Redundancy Protocol Version 3 for IPv4 and IPv6 draft-ietf-vrrp-unified-spec-05", Internet Draft, VRRPv3 for IPv4 and IPv6, 2009, pp. 1-41.
McCloghrie et al, "Management Information Base for Network Management of TCP/IP-Based Internets: MIB-II", Request for Comments 1213, 1991, pp. 1-70.

(Continued)

*Primary Examiner* — Marsha D Banks Harold
*Assistant Examiner* — Christopher Wyllie
(74) *Attorney, Agent, or Firm* — Kramer & Amado P.C

(57) ABSTRACT

The invention is directed to routing data packets in networks having routers configured as a virtual router using virtual router redundancy protocol (VRRP). Embodiments of the invention adjust route metrics to aid in providing predictable selection of routes into VRRP subnets. Advantageously, providing predictable selection of routes into VRRP subnets enhances a network operator's ability to meet service level agreements for critical or delay sensitive applications.

18 Claims, 4 Drawing Sheets

(56) References Cited

OTHER PUBLICATIONS

Thaler et al, Multipath Issues in Unicast and Multicast Next-Hop Selection, Request for Comments 2991, 2000, pp. 1-9.

Hopps, "Analysis of an Equal-Cost Multi-Path Algorithm", Request for Comments 2992, 2000, pp. 1-8.

Hinden, Virtual Router Redundancy Protocol (VRRP), Request for Comments 3768, 2004, pp. 1-27.

\* cited by examiner

DYNAMIC ROUTE COST ADJUSTMENT OF VRRP ENABLED SUBNETS FOR ROUTING PROTOCOLS

FIELD OF THE INVENTION

The invention is directed to packet data networks, particularly to routing data packets in networks having routers configured as a virtual router using virtual router redundancy protocol (VRRP).

BACKGROUND OF THE INVENTION

VRRP is a protocol described in Internet Engineering Task Force (IETF) document RFC 3768. The purpose of VRRP is to increase the availability of a default gateway servicing hosts on the same subnet. VRRP allows two or more physical routers to act as a single virtual router comprising a primary router actively routing data packet traffic and one or more backup routers, one of which will replace the role of the primary router should it fail. Currently, there is a need to update VRRP for use with Internet Protocol version 6 (IPv6). For example, IETF draft-ietf-vrrp-unified-spec proposes such an updated version of VRRP.

VRRP is typically used by Enterprises to provide redundancy at some major strategic data center that requires continuous operation to serve its clients. In many cases, Enterprises build their data centers with two different backbone connections, each connection via a separate physical router. When implementing VRRP, the Enterprise will configure the two physical routers as a virtual router. Each of the physical routers will therefore have a respective connection to the backbone network and each will be connected to the data center's local area network (LAN), also referred to as a VRRP subnet subsequent to VRRP implementation. The VRRP subnet provides a connection between the two physical routers, hereinafter referred to as VRRP routers.

According to routing protocols such as border gateway protocol (BGP) described in IETF document RFC4271, a route metric/cost is associated with the output side of each router interface. This cost is configurable by the system administrator and it always has a default value. The lower the cost, the more likely the interface is to be used to forward data traffic.

By design, VRRP and routing protocols do not interact with each other. This means that a routing protocol will be unaware of the state of a VRRP router interface, also referred to herein as a VRRP interface. That is, the routing protocol will be unaware whether the VRRP router is a primary or a backup VRRP router. When advertising a Local Interface route of the VRRP subnet, from both the primary and backup routers, the same default cost is used.

The problem is that the static route metric/cost can result in routes to the VRRP subnet having equal cost, or in many configurations the backup VRRP router ends up being the best next hop to the VRRP subnet. While neither case is desirable, the former can be particularly problematic for applications sensitive to unequal multipath delays if equal cost multipath (ECMP) routing is enabled, since traffic from a remote host to any host in the VRRP subnet can take different paths. IETF documents RFC2991 and RFC2992 address issues and techniques of ECMP routing.

SUMMARY

Embodiments of the invention are directed to adjusting route metrics to aid in providing predictable selection of routes into VRRP subnets.

According to an embodiment of the invention, a simple mechanism is provided to influence routing protocols depending on the state of a VRRP interface without having to modify the routing protocols or VRRP standards.

Some embodiments of the invention enable a user to activate VRRP routing on a router, after which a routing table metric of the router will be updated depending on whether the router is a primary or a backup VRRP router.

Advantageously, providing predictable selection of routes into VRRP subnets enhances a network operator's ability to meet service level agreements (SLA) for critical or delay sensitive applications.

According to an aspect of the invention a method is provided of adjusting route metrics in a data packet router. The method comprises the steps of: determining if virtual routing redundancy protocol VRRP routing is enabled on the router; determining, responsive to VRRP being enabled on the router, if the router is a backup VRRP router; and setting on the router, responsive to VRRP being enabled on the router and the router being a VRRP backup router, a pointer in a routing information base RIB entry for an interface of the router to point to a first metric entry of a management information base MIB object corresponding to the interface.

Advantageously, the method may further include the step of setting on the router, responsive to VRRP being enabled on the router and the router not being a VRRP backup router, the pointer to point to a second metric entry of the MIB object, wherein the second metric entry has a value that is different than a value of the first metric entry.

Advantageously, the method may further include the step of setting on the router, responsive to VRRP not being enabled on the router, the pointer to point to the second metric entry of the MIB object.

According to an aspect of the invention data packet router capable of executing virtual routing redundancy protocol VRRP is provided. The router comprises a routing information base RIB having an entry including a pointer; a management information base MIB having an object corresponding to an interface of the router; a VRRP flag for providing an indication whether or not VRRP routing is enabled on the router; a virtual router identifier VRID for indicating whether or not the router is a backup VRRP router when VRRP routing is enabled on the router; and a function for causing the pointer to point to a first metric of the object when VRRP routing is enabled on the router and the router is a backup VRRP router and for causing the pointer to otherwise point to a second metric of the object.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
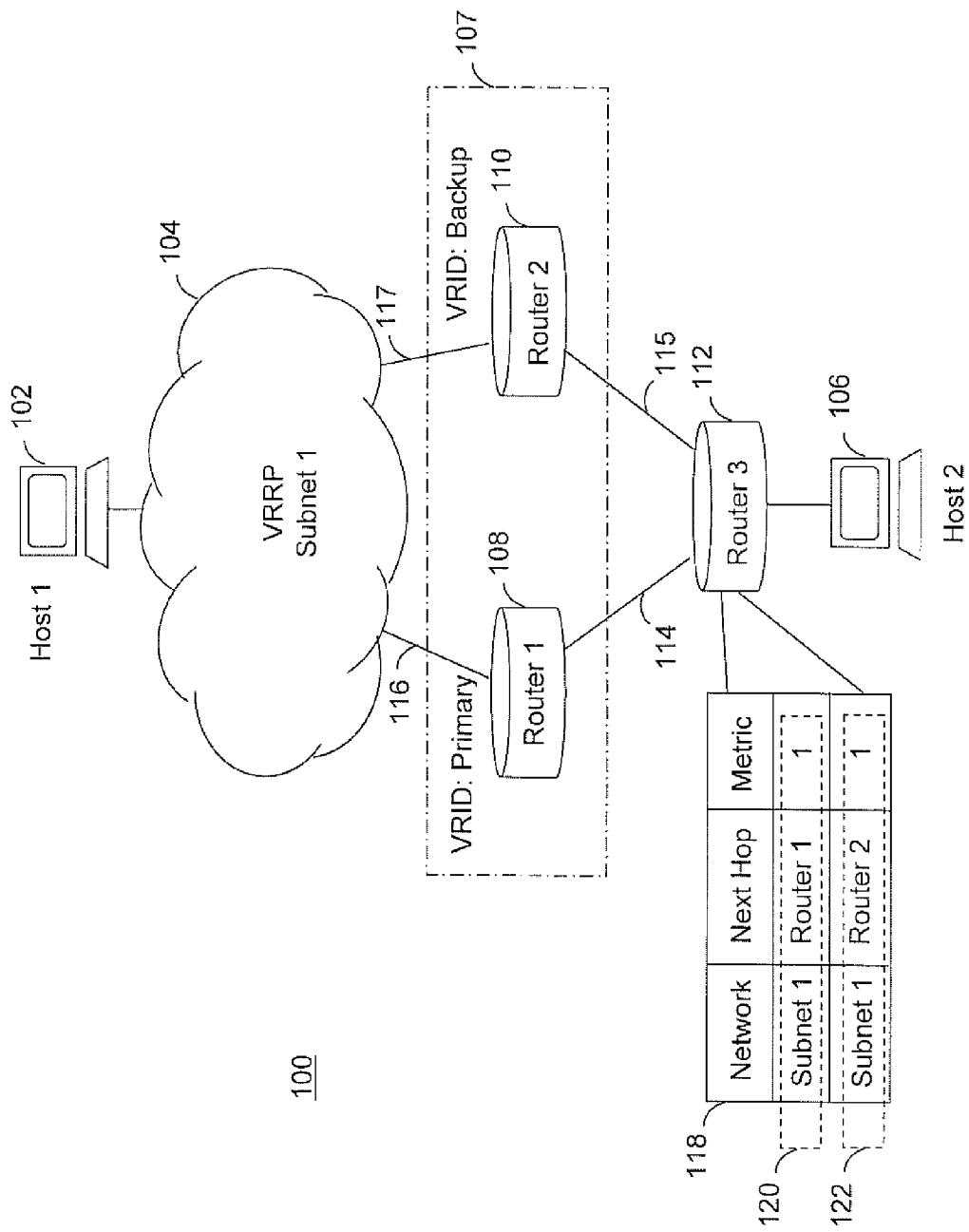
FIG. 1 illustrates a VRRP configuration resulting in ECMP route selection.

In reference to FIG. 1, a VRRP configuration 100 includes a first host 102 connected to a VRRP subnet 104, also referred to as subnet 1. A second host 106 can communicate data packets with the first host 102 via a virtual router 107, comprising a first router 108 and a second router 110, and a third router 112. The first router 108 is the primary router of the virtual router 107, so denoted by having a VRID set to "primary" in the figure, whereas the second router 110 is the backup router of the virtual router 107, so denoted by its VRID set to "secondary" in the figure. The virtual router 107 has two connections to the third router 112, these connections representing the aforementioned connections to a backbone network. A first backbone connection 114 of the two connections enables the first router 108 to communicate data packets with the third router 112, and a second backbone connection 115 likewise enables the second router 110 to communicate data packets to the third router 112. Each of the first and second routers 108, 110 also has a respective connection to the VRRP subnet 104. Respectively these connections are a first LAN connection 116 and a second LAN connection 117.

The third router 112 includes a routing table 118 that among other entries includes routing information to route data packets to the VRRP subnet 104. A first entry 120 of the table 118 for a first route includes a network parameter equal to the address of the VRRP subnet, shown as "Subnet 1" in the figure, a next hop parameter equal to the address of the first router 108, shown as "Router 1" in the figure, and a metric parameter for the first route, shown as "1" in the figure. Likewise, a second entry 122 of the table 118 for a second route includes a network parameter equal to the address of the VRRP subnet, shown as "Subnet 1" in the figure, a next hop parameter equal to the address of the second router 110, shown as "Router 2" in the figure, and a metric parameter for the second route, shown as "1" in the figure. In the case where ECMP route selection is employed by the third router 112, the first and second routes would be equally likely to be selected by the router 112 since the values of their respective metric parameters are equal in the routing table 118. In other words, the third router 112 has two equal cost multipath routes to the VRRP subnet 104.

Figure 2:
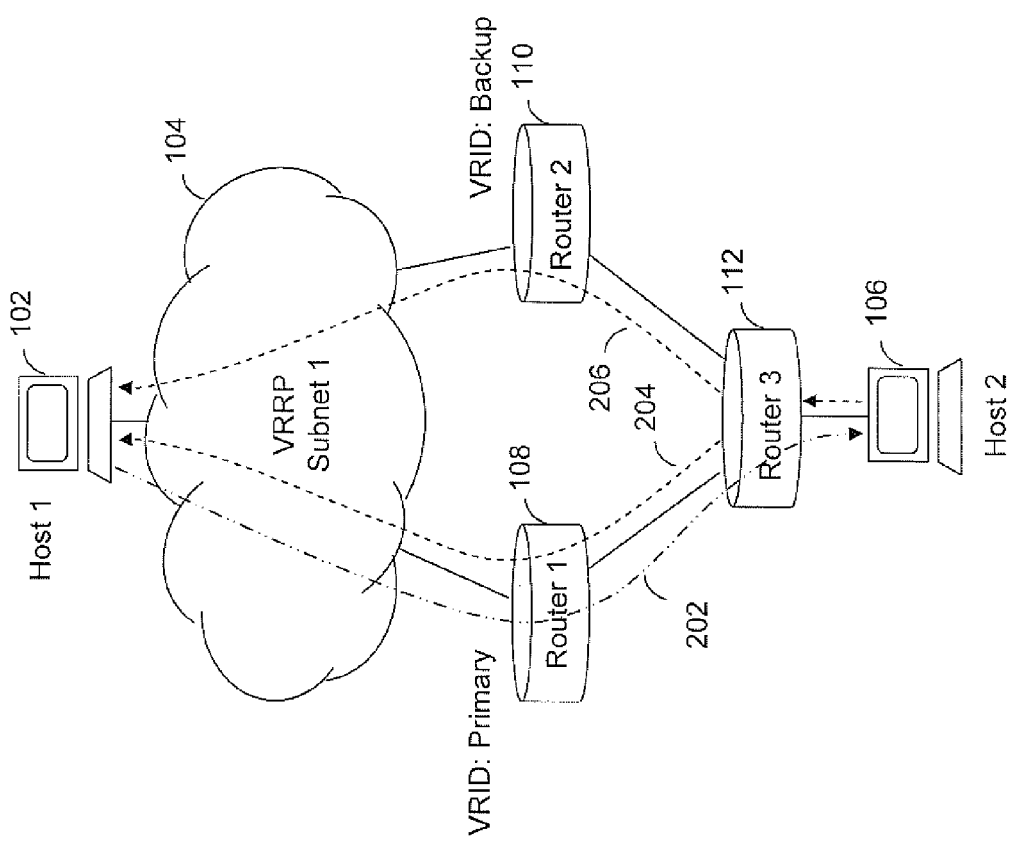
FIG. 2 illustrates paths taken by data packet traffic in FIG. 1.

In reference to FIG. 2, a flow of data packets between the first host 102 and the second host 106 follows a first path 202 through the VRRP subnet 104, the first router 108, and the third router 112. The first path 202 is not problematic because the first router 108 in this case is the primary router of the virtual router 107. However, when ECMP is employed by the third router 112, data packets flowing from the second host 106 to the first host 102 can take one of two paths; either through the first router 108 via a second path 204 or through the second router 110 via a third path 206. This situation can be problematic for delay sensitive traffic if the second and third paths 204, 206 have unequal transit delays.

In some cases where ECMP path selection uses a hashing algorithm based on the destination IP address of the subject data packet, the same path could be selected for all data packets destined to that IP address. In such cases it is possible that the selected path could transit the backup router of the virtual router, which would be undesirable since the traffic should be routed through the primary router of that virtual router. Some ECMP hashing algorithms could even be more dynamic as they might consider other variables such as source and/or destination TCP/UDP ports or even random generated keys, which would make predicting the selected path even more difficult, such as could be required to ensure SLAs are met on applications that are sensitive to traffic delays.

Figure 3:
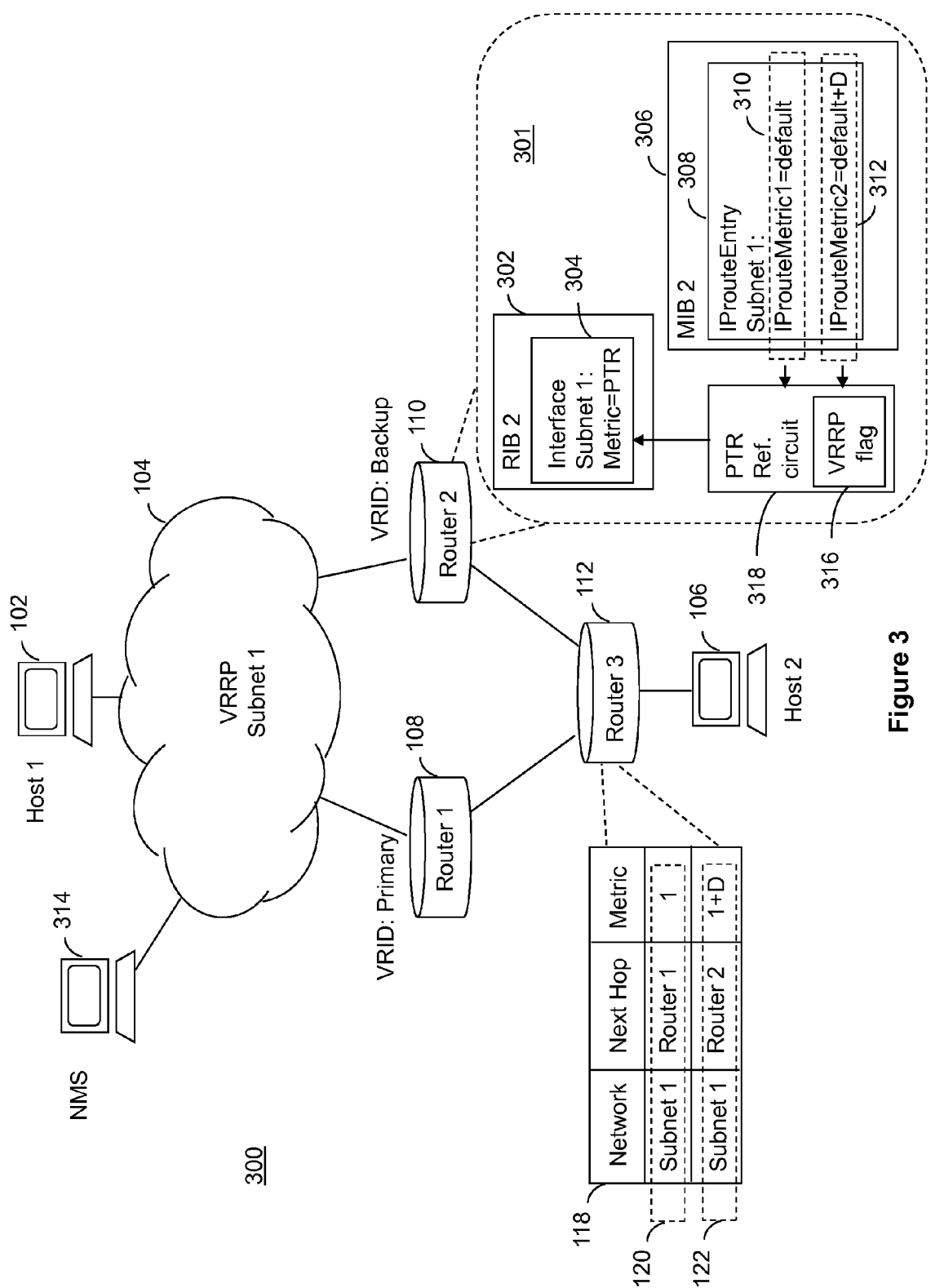
FIG. 3 illustrates a VRRP configuration according to an embodiment of the invention.

With reference to FIG. 3, a VRRP configuration 300 according to an embodiment of the invention enables path selection at the third router 112 to be influenced depending on which of the first or second routers 108, 110 of the virtual router 107 is the primary router and without having to modify VRRP or other routing protocols running on the routers.

To that end, modifications 301 have been made to the second router 110. The modifications affect a routing information base (RIB) 302, which includes an entry 304 of a metric for an interface to the subnet 1 (the VRRP subnet 104). The entry 304 sets the value of the metric as determined by a pointer, shown as "PTR" in the figure. The modifications 301 also affect a management information base (MIB) 306 having a first metric entry 310 and a second metric entry 312 for an IP route entry object 308 associated with the subnet 1. The first metric entry 310, shown as "IProuteMetric1" in the figure has a default value and the second metric entry 312, shown as "IProuteMetric2" in the figure, has a value equal to the sum of the default value plus an offset shown as "D" in the figure. The value of the offset D can be entered by an operator using a network management system 314 connected to the VRRP subnet 104, for example. The modifications 301 include addition of a pointer reference circuit 318 that uses a VRRP flag 316 included in the pointer reference circuit and the state of the router's VRID, i.e. either set to "primary" or "backup", to determine which one of the first or second metric entries 310, 312 is referenced by the pointer (PTR) of the RIB 302. The value of the VRRP flag 316 is set to reflect whether VRRP is enabled on the router 110 or not. For example, the VRRP flag 316 could be set by an operator using the NMS 314.

The first router 108 has been modified in the same manner as the second router 110 was modified by the modifications 301. Consequently, both the first and second routers 108, 110 will have respective metrics for an interface to subnet 1, wherein the value of each metric will be dependent on whether the given router 108, 110 has VRRP enabled and, if so, whether that router is the primary router or a backup router of the virtual router 107. Additionally, the first and second routers 108, 110 will include the value of their respective metric in route advertisements to other routers such as the third router 112, in accordance with routing protocols running on those routers. The result of receiving such route advertisements is shown in the routing table 118 of the third router 112, wherein the first entry 120 has a metric with a value of one and the second entry 122 has a metric with a different value, that value being "1+D".

Since the first entry 120 has a metric with a lower value than that of the second entry, the third router 112 will now exclusively select the path (second path 204 of FIG. 2) associated with the first entry 120 for data packet traffic destined to the VRRP subnet 1 104, e.g. the first host 102. This is desirable because that path is via the first router 108, which is the primary router of the virtual router 107. However, if the second router 110 were to become the primary router, the first and second entries 120, 122 would change due to new route advertisements from the first and second routers 108, 110 such that the offset D would be included in the metric of the first entry 120 and not in that of the second entry 122. In that case, the third router 112 would exclusively select the path (third path 206 of FIG. 2) associated with the second entry 122 for data packet traffic destined to the VRRP subnet 1 104, e.g. the first host 102.

To sum up, embodiments of the invention enable a user to activate VRRP routing on a router, via a network management system (NMS) console running command language interface (CLI) and simple network management protocol (SNMP). Accordingly, after VRRP routing has been activated, a routing table metric of the router will be updated depending on whether the router is a primary or a backup VRRP router. In the case the router has the VRRP virtual router interface as backup (i.e. VRID=backup), the router should take the regular metric of that interface and add a value "D", which has the affect of decreasing the "priority" of routes involving that interface when they are advertized by any routing protocol running on the router. When the router becomes the primary VRRP router, it should re-establish the default metric on that interface. The value D is configurable, for example from a user interface of the router or via a NMS or other type of management system.

Advantageously, this technique can be applied on subnets where critical or delay sensitive applications reside, at the discretion of a network administrator, and on a per virtual router basis.

Embodiments of the invention provide a VRRP backup router with functionality to modify respective cost values of directly connected routes (local routes) and store each such value in one of the unused metrics of the IpRouteEntry object of the corresponding route. This object is part of MIB-II, which is the second version of the Management Information Base for use with network management protocols in TCP/IP-based internets and is defined in IETF document RFC1213. A configuration command is used to set the offset value D (desired degraded metric value), which is added to the default metric value for a given route to obtain a backup local metric. The backup local metric is stored in one of the unused metrics of the IpRouteEntry object of that route. The aforementioned pointer function 318 controls which metric value, i.e. the backup local metric or default metric, will be used in the RIB of the router. This value has local significance and it will not be managed or propagated by VRRP. Consequently, changes to any of the standard MIBs or objects of the VRRP protocols are not required.

The metrics of the IpRouteEntry object of MIB-II are shown in bold typeface:

```
IpRouteEntry ::=
    SEQUENCE {
        ipRouteDest
            IpAddress,
        ipRouteIfIndex
            INTEGER,
        ipRouteMetric1
            INTEGER,
        ipRouteMetric2
            INTEGER,
        ipRouteMetric3
            INTEGER,
        ipRouteMetric4
            INTEGER,
        ipRouteNextHop
            IpAddress,
        ipRouteType
            INTEGER,
        ipRouteProto
            INTEGER,
        ipRouteAge
            INTEGER,
        ipRouteMask
            IpAddress,
        ipRouteMetric5
            INTEGER,
        ipRouteInfo
            OBJECT IDENTIFIER
    }.
```

Usually router vendors store the interface cost on ipRouteMetric1. A first embodiment of the invention stores the new backup local metric on the object ipRouteMetric2 such that the pointer (PTR in FIG. 3) moves between ipRouteMetric1 and ipRouteMetric2 depending on the role of the VRRP router interface. The primary router 108 will point to ipRouterMetric1 and backup router 110 will point to ipRouterMetric2. Other embodiments could use any other unused metric or mechanism to achieve the functionality described above.

In operation, embodiments of the invention achieve a "dynamic" metric. This results from adding the cost of the "default metric or configured metric" to a "desired degraded" metric value (the offset D) configurable by the network administrator. The resulting metric is used when the corresponding VRRP interface runs in backup state. When the VRRP interface runs in the primary state, i.e. the router becomes the primary router, then the value of the metric is reset back to the "default or configured metric". In this manner the metric is dynamic. When network routing protocols import or redistribute the local routes, they will inherit the latest value of the "dynamic" metric. An example of such inheritance is shown in the routing table 118 of FIG. 3.

Accordingly, network routing tables will include metrics that are effectively modified by the state of the VRRP routers, particularly the MIB object IpRouteEntry metrics of corresponding routes to those routers. The metrics of the routes will be dynamically modified by an amount, the offset D configured by the network administrator, when the VRRP interface of that route changes from a primary to a backup state and visa versa. Therefore, with the value of the offset D chosen with sufficient consideration to design of the network, all data packet traffic between local hosts, e.g. the first host 102, and remotes hosts, e.g. the second host 104, will be routed through the primary VRRP router 108. Therefore packets transmitted or received from either of the local or remote hosts will take the same path, which solves the aforementioned problems for delay sensitive traffic.

Figure 4:
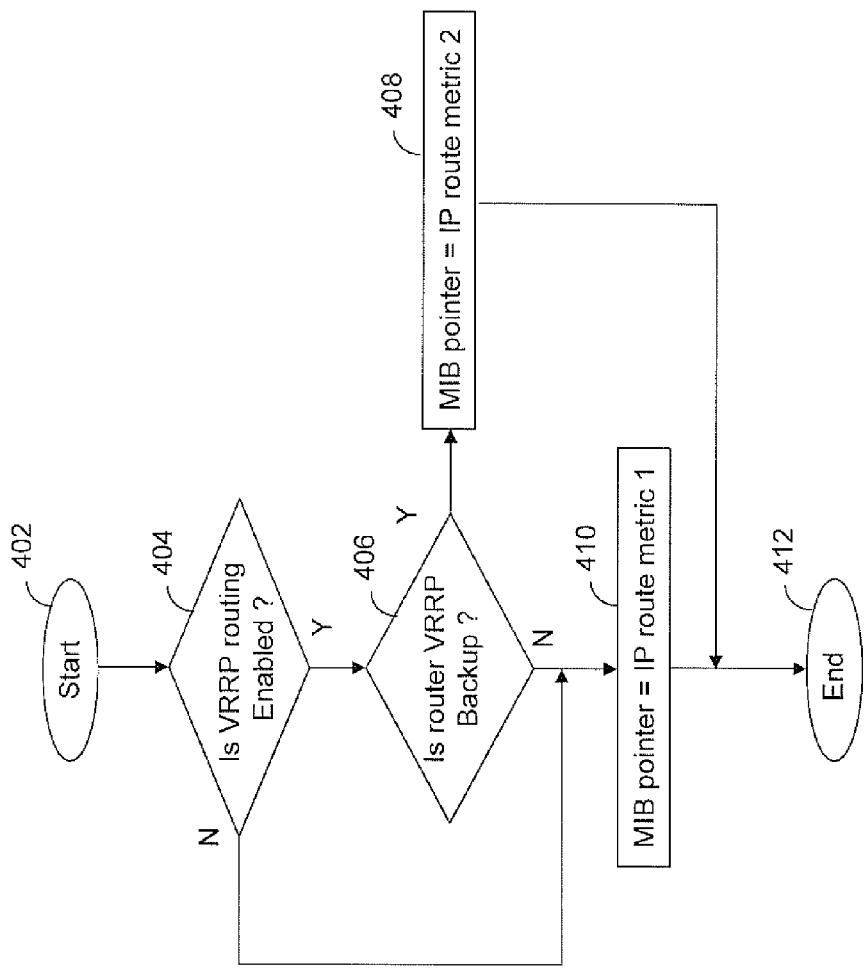
FIG. 4 illustrates a method of adjusting route metrics in the VRRP configuration of FIG. 3.

FIG. 4 shows a method 400 of adjusting route metrics according to an embodiment of the invention. This method 400 is implemented in the pointer function 318 of FIG. 3 in both of the routers 108, 110.

Referring to FIG. 3 and FIG. 4, immediately upon starting 402 the method 400 determines 404 if the VRRP routing is enabled on the router wherein the method 400 is implemented. This determination is made by checking the VRRP flag 316. If the VRRP flag 316 is set, which means that VRRP routing is enabled, the method 400 then proceeds to determine 406 whether or not the router is currently acting as the backup VRRP router. This determination is made by checking the VRID of the router, which if set to "backup" (or some similar indication) means that the router is currently the backup VRRP router. If the router is currently the backup VRRP router, then the method 400 sets 408 the MIB pointer (PTR) of the RIB entry 304 for the interface of the VRRP subnet 104 to point to the second metric entry 312 of the corresponding MIB object 308, which second metric entry 312 includes the offset D plus a default value. The method 400 then ends 412.

However, if the method 400 determines 406 that the router is not currently the backup router, hence the router is currently the primary router, then the method 400 sets 410 the MIB pointer (FIR) of the RIB entry 304 for the interface of the VRRP subnet 104 to point to the first metric entry 310 of the corresponding MIB object 308, which first metric entry 310 does not include the offset D but only includes the default value. The method 400 then ends 412.

Likewise, if the method 400 determines 404 that VRRP routing is not enabled on the router, i.e. the VRRP flag 316 is not set, the method 400 sets 410 MIB pointer (PTR) of the RIB entry 304 for the interface of the VRRP subnet 104 to point to the first metric entry 310. The method 400 then ends 412.

The method 400 can be implemented to run in an endless loop so that any changes to enablement of VRRP routing on the router, e.g. the VRRP flag 316, or the VRRP interface status, e.g. as indicated by the VRID either primary or backup, can be effected in the router's RIB with minimal delay. Alternatively, the start 402 of the method 400 could be initiated subsequent to detecting a change in the enablement of VRRP routing on the router or the status of the router's VRRP interface.

Advantageously, embodiments of the invention enable a network administrator to engineer traffic to follow the VRRP primary router location to obtain predictable routing paths that guarantee desirable SLAs for critical or time sensitive applications such as Voice over IP (VoIP). In VRRP enabled networks, embodiments of the invention provide a solution to dictate predictable paths in and out the VRRP network in presence of equal cost routing.

Numerous modifications, variations and adaptations may be made to the embodiments of the invention described above without departing from the scope of the invention, which is defined in the claims.

What is claimed is:

1. A method of adjusting route metrics in a data packet router, comprising the steps of:
    determining if virtual routing redundancy protocol (VRRP) routing is enabled on the router;
    determining, responsive to VRRP being enabled on the router, if the router is a backup VRRP router;
    setting on the router, responsive to VRRP being enabled on the router and the router being a VRRP backup router, a pointer in a routing information base (RIB) entry for an interface of the router to point to a first metric entry of a management information base (MIB) object corresponding to the interface; and
    setting on the router, responsive to VRRP being enabled on the router and the router not being a VRRP backup router, the pointer to point to a second metric entry of the MIB object, wherein the second metric entry has a value that is different than a value of the first metric entry.

2. The method of claim 1, wherein the value of the second metric entry is lower than the value of the first metric entry.

3. The method of claim 2, wherein the value of the first metric entry equals a configurable offset value plus a default value.

4. The method of claim 3, wherein the value of the second metric entry equals the default value.

5. The method of claim 1, further comprising the step of:
    setting on the router, responsive to VRRP not being enabled on the router, the pointer to point to the second metric entry of the MIB object.

6. The method of claim 4, further comprising the step of:
    setting on the router, responsive to VRRP not being enabled on the router, the pointer to point to the second metric entry of the MIB object.

7. The method of claim 1, wherein the step of determining if VRRP routing is enabled on the router comprises checking a VRRP flag on the router.

8. The method of claim 1, wherein the step of determining if the router is a backup VRRP router comprises checking a state of a virtual router identifier VRID of the router.

9. The method of claim 1, wherein if VRRP routing is enabled on the router, the interface is connected to a VRRP subnet, the subnet connected to another VRRP enabled router such that both said routers form a VRRP virtual router configuration.

10. A data packet router capable of executing virtual routing redundancy protocol (VRRB), comprising:
    a routing information base (RIB) having an entry including a pointer;
    a management information base (MIB) having an object corresponding to an interface of the router;
    a VRRP flag for providing an indication whether or not VRRP routing is enabled on the router;
    a virtual router identifier VRID for indicating whether or not the router is a backup VRRP router when VRRP routing is enabled on the router; and
    a pointer reference circuit for causing the pointer to point to a first metric of the object when VRRP routing is enabled on the router and the router is a backup VRRP router and for causing the pointer to otherwise point to a second metric of the object, wherein the pointer referencing circuit comprises the VRRP flag.

11. The router of claim 10, wherein the second metric has a value that is different than a value of the first metric.

12. The router of claim 11, wherein the value of the second first metric entry is lower than the value of the first metric entry.

13. The router of claim 12, wherein the value of the first metric entry equals a configurable offset value plus a default value.

14. The router of claim 13, wherein the value of the second metric entry equals the default value.

15. The method of claim 1, wherein the pointer in the RIB entry corresponds to a cost metric for the interface.

16. The method of claim 1, wherein the MIB object is an IpRouteEntry object.

17. The method of claim 9, further comprising providing the entry in the RIB via a route advertisement to a router outside of the VRRP virtual router configuration.

18. A method of adjusting route metrics in a data packet router, comprising the steps of:
    determining if virtual routing redundancy protocol (VRRP) routing is enabled on the router;
    determining, responsive to VRRP being enabled on the router, if the router is a backup VRRP router;
    setting on the router, responsive to VRRP being enabled on the router and the router being a VRRP backup router, a pointer in a routing information base (RIB) entry for an interface of the router to point to a first metric entry of a management information base (MIB) object corresponding to the interface; and
    setting on the router, responsive to VRRP being enabled on the router and the router not being a VRRP backup router, the pointer to point to a second metric entry of the MIB object, wherein the second metric entry has a value that is different than a value of the first metric entry, wherein the RIB entry is used for a protocol other than VRRP.

* * * * *